(12) United States Patent
Huang (10) Patent No.: US 7,984,112 B2
(45) Date of Patent: *Jul. 19, 2011

(54) OPTIMIZING BATCH SIZE FOR PREFETCHING DATA OVER WIDE AREA NETWORKS

(75) Inventor: An-Cheng Huang, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,723

(22) Filed: Mar. 18, 2010

(65) Prior Publication Data

US 2010/0174823 A1  Jul. 8, 2010

Related U.S. Application Data

(63) Continuation of application No. 11/495,599, filed on Jul. 31, 2006, now Pat. No. 7,711,797.

(51) Int. Cl.
*G06F 15/16* (2006.01)
*G06F 3/00* (2006.01)
(52) U.S. Cl. ............... 709/218; 709/233; 710/36
(58) Field of Classification Search ............... None
See application file for complete search history.

(56) References Cited

U.S. PATENT DOCUMENTS

| 5,541,919 A | 7/1996 | Yong et al. |
| 6,557,055 B1 | 4/2003 | Wiese |
| 6,963,954 B1 | 11/2005 | Trehus et al. |
| 7,359,890 B1 | 4/2008 | Ku et al. |
| 2001/0048728 A1 | 12/2001 | Peng |
| 2002/0091722 A1 | 7/2002 | Gupta et al. |

OTHER PUBLICATIONS

Co-pending U.S. Appl. No. 11/495,599, filed Jul. 31, 2006, An-Cheng Huang, entitled "Optimizing Batch Size for Prefetching Data Over Wide Area Networks."
"Using Predictive Prefetching to Improve World Wide Web Latency," Venkata N. Padmanabhan and Jeffrey C. Mogul, ACM SIGCOMM Computer Communication Review, vol. 26, Issue 3, Jul. 1996.
"The Network Effects of Prefetching," Mark Crovella and Paul Barford, Proceedings of IEEE INFOCOMM '98, Mar. 1998.
"A Fast File System for UNIX," Marshall K. McKusick, William N. Joy, Samuel J. Leffler, and Robert S. Fabry, ACM Transactions on Computer Systems, vol. 2, Issue 3, Aug. 1984.
"An Adaptive Network Prefetch Scheme," Zhimei Jiang and Leonard Kleinrock, IEEE Journal on Selected Areas of Communications, vol. 16, Issue 3, Apr. 1998.
"NPS: A Non-interfering Deployable Web Prefetching System," Ravi Kokku, Praveen Yalagandula, Arun Venkataramani and Mike Dahlin, Proceedings of the 4$^{th}$ USENIX Symposium on Internet Technologies and Systems, Mar. 2003.
"The Performance Impact of Kernel Prefetching on Buffer Cache Replacement Algorithms," Ali R. Butt, Chris Gniady and Y. Charlie Hu, Proceedings of ACM SIGMETRICS '05, Jun. 2005.

(Continued)

*Primary Examiner* — Wen-Tai Lin
(74) *Attorney, Agent, or Firm* — Harrity & Harrity, LLP (57) ABSTRACT

A data prefetching technique optimizes the batch size of prefetch requests. The optimized batch size may be determined based on a prefetch transfer time of a previous prefetch operation, where the prefetch transfer time is measured as an elapsed time interval from when data from the previous prefetch operation is first received to when the data from the previous prefetch operation is finished being received.

18 Claims, 6 Drawing Sheets

OTHER PUBLICATIONS

"Informed Prefetching and Caching," Patterson, R.H., Gibson, G.A., Ginting, E., Stodolsky, D. and Zelenka, J., Proceedings of the 15$^{th}$ ACM Symposium of Operating Systems Principles, Dec. 1995.

"A Cost-Benefit Scheme for High Performance Predictive Prefetching," Vivekanand Vellanki and Ann Chervenak, Proceedings of ACM/IEEE Supercomputing '99, 1999.

"Performance Measurements of Automatic Prefetching," J. Griffioen and R. Appleton, Proceedings of the ISCA, International Conference on Parallel and Distributed Computing Systems, Sep. 1995.

"Implementation and Performance of Integrated Application-Controlled File Caching, Prefetching and Disk Scheduling," Pei Cao, Edward W. Felten, Anna R. Karlin and Kai Li, ACM Transactions on Computer Systems, vol. 14, No. 4, Nov. 1996.

"Prefetching over a Network: Early Experience with CTIP," David Rochberg and Garth Gibson, ACM SIGMETRICS Performance Evaluation Review, vol. 25, Issue 3, Dec. 1997.

"NFS over RDMA," Brent Callaghan, Theresa Lingutla-Raj, Alex Chiu, Peter Staubach and Omer Asad, Proceedings of ACM SIGCOMM 2003 Workshop on Network-I/O Convergence: Experience, Lessons, Implications, Aug. 2003.

OPTIMIZING BATCH SIZE FOR PREFETCHING DATA OVER WIDE AREA NETWORKS

RELATED APPLICATION

This application is a continuation of U.S. patent application Ser. No. 11/495,599, filed Jul. 31, 2006 and issued as U.S. Pat. No. 7,711,797, which is incorporated herein by reference.

BACKGROUND OF THE INVENTION

A. Field of the Invention

Concepts described herein relate generally to data prefetching, and more particularly, to optimizing prefetching over wide area networks (WANs).

B. Description of Related Art

Geographically distributed entities, such as a business with multiple local offices in different locations, frequently desire to maintain a logically unified proprietary network that is accessible by all of the geographically distributed entities. To accomplish this, a wide area network (WAN) may be used to link the different locations.

Information technology (IT) managers within geographically distributed entities face the conflicting requirements of keeping costs in check while providing users with new and faster applications. This conflict is most acute on the WAN, where costs can be high and getting applications to perform well is hampered by limited bandwidth and high latency.

Solutions are known to help improve performance over the WAN portion of a network. These solutions may be based on a number of technologies, including data compression, data caching, application-specific acceleration, policy-based bandwidth allocation, and data prefetching.

Data prefetching, in particular, may be used to reduce the perceived latency (response time) of data being accessed over a WAN. One problem encountered when prefetching data is the determination of how much data to prefetch in a single prefetch "batch." On one hand, prefetching too little data may result in lost opportunities for WAN optimization. On the other hand, prefetching too much data in one batch may hurt the client-perceived latency instead of improving it.

SUMMARY

One aspect is directed to a device for prefetching data over a network. The device includes logic to determine a batch size of data that is to be prefetched based on a prefetch transfer time of a previous prefetch. The device further includes logic to initiate a data prefetch over the network using the determined batch size.

Another aspect is directed to a method of performing a prefetch operation of a batch of data over a network. The method includes measuring a prefetch transfer time of a previously prefetched batch of data as an elapsed time interval from when data from the previous prefetch is first received to when the data from the previous prefetch is finished being received. The method further includes comparing the measured prefetch transfer time to a threshold value and modifying a size of a next batch of data that is to be prefetched over the network based on the comparison.

Another aspect is directed to a system for accelerating application performance over a network. The system includes a first network acceleration device configured to transmit data prefetch requests to request a determined batch size of data. The first network acceleration device determines the batch size to request based on a prefetch transfer time observed for previous prefetch requests. The system further includes a second network acceleration device configured to receive the data prefetch requests and to transmit the determined amount of data to the first network acceleration device.

Yet another aspect is directed to a method including measuring a time interval from a previous data prefetch operation with a network device. The method further includes modifying a prior batch size value based on the time interval and performing a data prefetch operation with the network device using the modified batch size.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network acceleration device may operate to increase application performance over a network by prefetching data over the network. The network acceleration device may measure prefetch transfer times for batches of data being transferred over the network. Based on prior measured prefetch transfer time(s), the network acceleration device may modify the size of a next batch of prefetch data so that the prefetch transfer time for the next batch of data approaches a potentially optimal target level.

Exemplary System Overview

Figure 1:
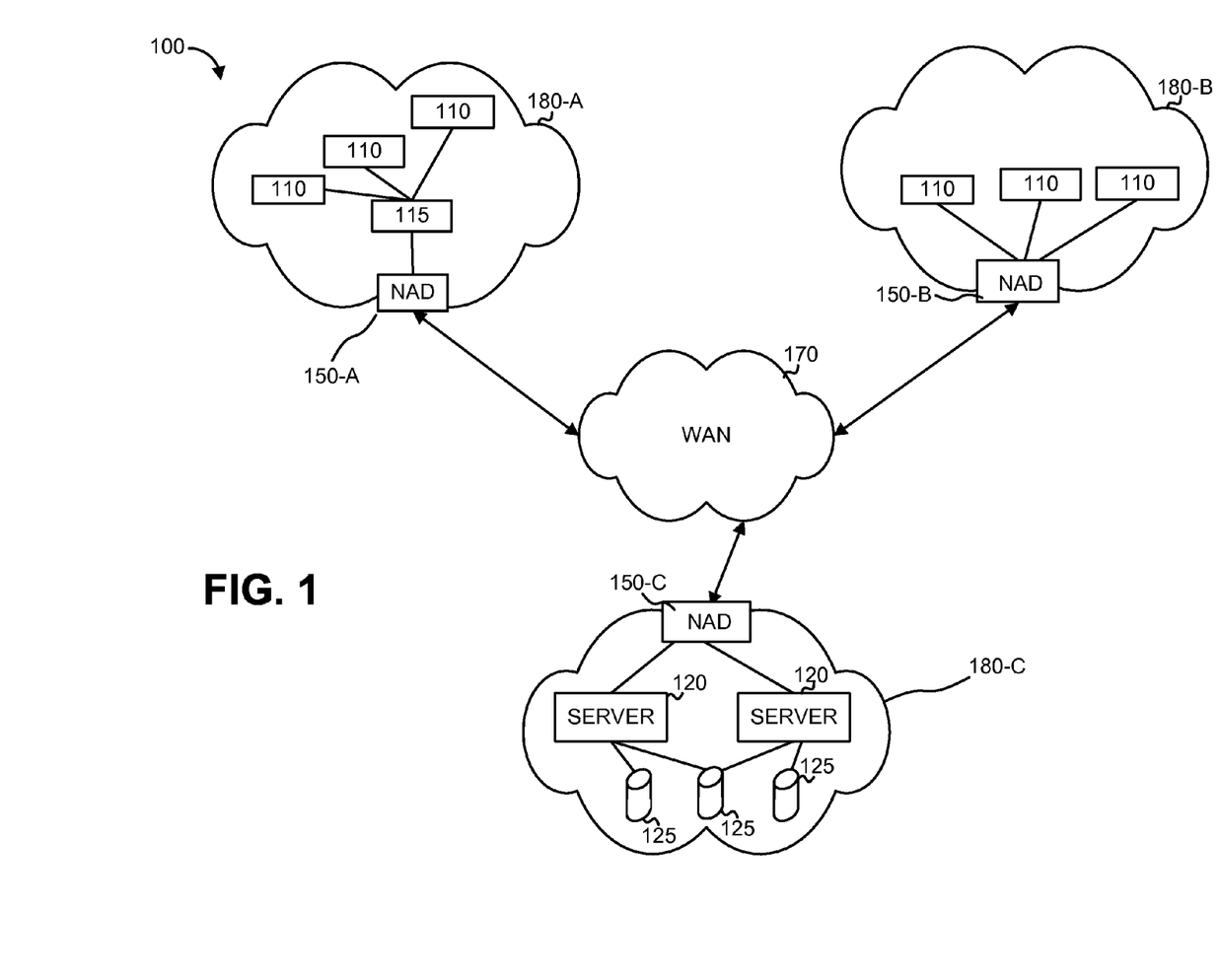
FIG. 1 is a diagram of an exemplary system.

FIG. 1 is a diagram of an exemplary system 100. System 100 may include a wide area network (WAN) 170 and one or more private networks 180-A, 180-B, and 180-C (collectively referred to as private networks 180). Private networks 180 may be geographically dispersed and different ones of private networks 180 may wish to communicate with one another over WAN 170. Private networks 180 may each, for example, be a local area network (LAN) for a branch office associated with a corporation or other entity. As another example, private networks 180-A and 180-B may be LANs for a corporate branch office and private network 180-C may be a data center for the corporation.

WAN 170 may include a public network, such as the Internet. In some implementations, WAN 170 may be implemented by privately owned or leased data lines between private networks 180, or by a combination of a public network and privately owned or leased data lines. In general, data traffic between private networks 180 through WAN 170 may be characterized by one or more of increased cost, higher latency, or lower bandwidth than data traffic within a single corporate network 180. Accordingly, network applications accessing resources between private networks 180 and across WAN 170 may tend to run less optimally than an application running locally at a private network 180.

Private networks 180 may each include a number of computing devices, such as, for example, client computing stations 110, network security device(s) 115, servers 120, and databases 125. Client computing stations 110 may include computing devices of end-users, such as desktop computers or laptops. Network security devices may include, for example, firewalls or other devices relating to network security. Servers 120 may include one or more devices designed to interact with and deliver information to other devices, such as client computing stations 110. Servers 120 may, for example, serve data files or network applications to computing stations 110 over WAN 170. Servers may interact with databases 125 when providing information to client computing stations 110.

In the exemplary system shown in FIG. 1, private networks 180-A and 180-B may be branch offices that include a number of client computing stations 110 and private network 180-C may function as a data center that includes a number of servers 120, which may include file servers for private networks 180-A and 180-B. One of ordinary skill in the art will recognize that the number of private networks shown in FIG. 1 (three), the elements associated with each private network and/or the functionality of each private network is exemplary.

Consistent with an aspect of the invention, private networks may be associated with network acceleration devices (NADs) 150-A through 150-C (collectively referred to as network acceleration devices 150). As shown in FIG. 1, for example, each of private networks 180-A through 180-C is associated with a corresponding network acceleration device 150-A, 150-B, and 150-C, respectively. Network acceleration devices 150 may generally operate to enhance the performance of applications running over WAN 170 between various ones of private networks 180. For example, assume that a user at one of client computing stations 110 at private network 180-A would like to retrieve a file from a file server at private network 180-C. In this situation, network acceleration devices 150-A and 150-C may operate to decrease the perceived latency and/or increase the perceived bandwidth of WAN 170 by providing, for example, data compression, data caching, and data prefetching services over WAN 170. Aspects of network acceleration devices 150 as they relate to data prefetching will be particularly described in more detail herein.

Exemplary Device Architecture

Figure 2:
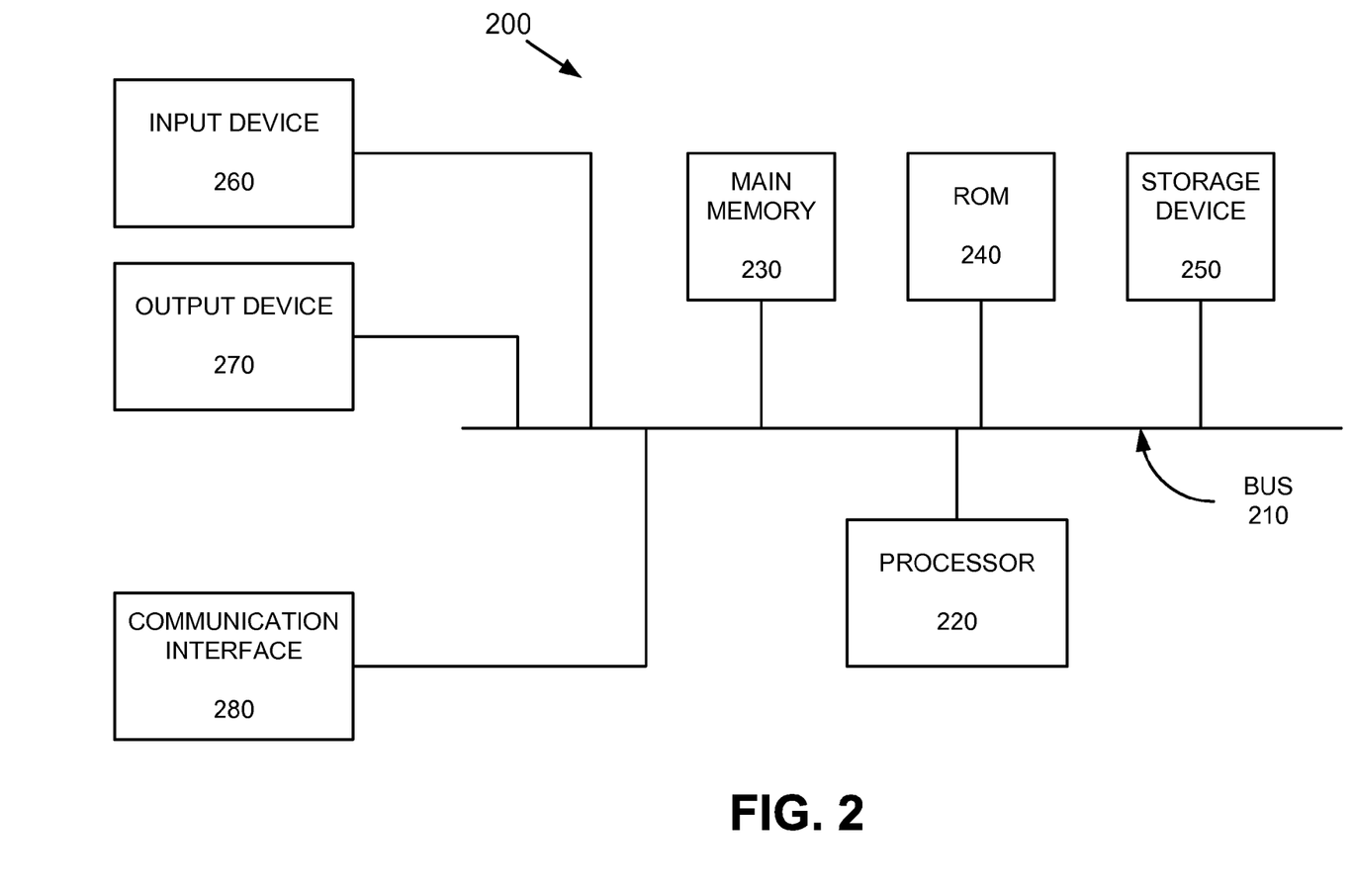
FIG. 2 is a block diagram of an exemplary device shown in FIG. 1.

FIG. 2 is a block diagram of an exemplary device 200, which may correspond to one or more of client computing stations 110, network security device 115, a server 120, a database 125, or a network security device 150. Device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

Device 200 may perform certain operations, as described in detail below. The device may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Prefetch Operations

Before describing the operation of network acceleration devices 150 in additional detail, it will be helpful to generally describe prefetch operations.

Figure 3A:
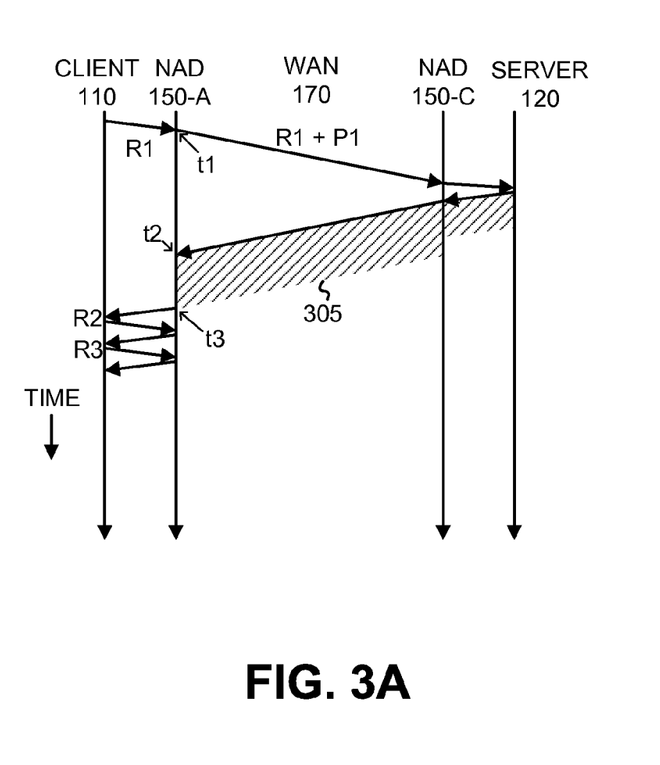
FIGS. 3A and 3B are timing diagrams illustrating prefetching data over a wide area network.
Figure 3B:
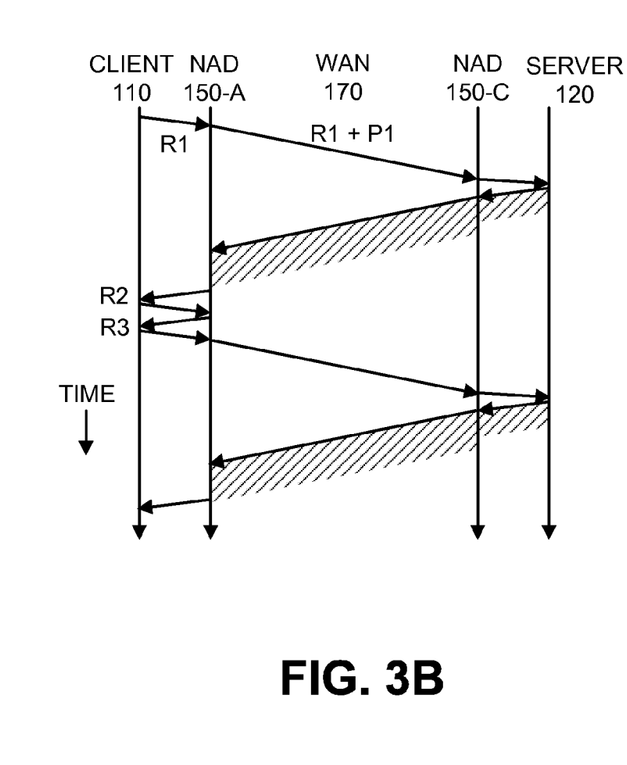

FIGS. 3A and 3B are timing diagrams illustrating prefetching data over a WAN, such as WAN 170. The data may be, for example, file data from a remote server, such as a file being fetched by a client computing station 110 from a file server 120.

Assume that a client computing station 110 in private network 180-A requests a file or a portion of a file from a file server 120 in private network 180-C. The file transfer is being made across WAN 170. Network acceleration devices 150-A and 150-C may operate to increase the perceived performance of file transfers for client computing station 110 by, among other things, prefetching data over WAN 170.

Client computing station 110 may begin by issuing a read request (R1) to network acceleration device 150-A for the file. Network acceleration device 150-A may add a prefetch request (P1) to the read request and forward both to network acceleration device 150-C. The prefetch request may be a request for a file or a portion of a file that network acceleration device 150-A determines is likely to be accessed next by client computing station 110 given the file or portion of a file requested by client computing station 110 in read request R1. For example, prefetch request P1 may refer to the next sequential file or next portion of the file referred to by read request R1. In this example, assume that read request R1 is a 32 kilobyte (KB) request and the prefetch request P1 is a 64 KB request for the next two sequential portions of the file referred to by read request R1. Thus, the total request size (R1+P1) is 96 KB and is shown as being made at time t1. The total request size (e.g., 96 KB in this example) will be called the batch size herein.

In some situations, a network acceleration device 150 may proactively issue prefetch requests by themselves without a corresponding read request. In this situation, the total request size and the batch size can be equal to the size of the prefetch request. For example, in the example of FIG. 3A, network acceleration device 150-A may immediately provide the prefeteched data corresponding to read request R3 and then proactively send a prefetch request P2 to network acceleration device 150-C. In this case, the batch size may be defined as the size of P2.

Read request R1 and prefetch request P1 may be received by network acceleration device 150-C and forwarded to server 120, which handles the request and sends back the appropriate data. The batch transfer time across WAN 170 for the request corresponding to read request R1 and prefetch request P1 is shown in FIG. 3A as shaded area 305. The transfer time may be affected by a number of factors, including the bandwidth of WAN 170 and any data compression performed by network acceleration devices 150-A and 150-C. Network acceleration device 150-A begins to receive batch 305 at time t2 and finishes receiving batch 305 at time t3.

Assume that client 110 next issues read requests R2 and R3, and that these requests correspond to the 64 KB of data that was prefetched with prefetch request P1. As shown in FIG. 3A, in this situation, network acceleration device 150-A can provide the data without making a request over WAN 170, thus eliminating the latency (i.e., the WAN round trip time) that would otherwise have been incurred by these requests.

FIG. 3B is a timing diagram illustrating an exemplary prefetch operation similar to that shown in FIG. 3A. In FIG. 3B, however, assume that the prefetch request P1 data size is only 32 KB (instead of 64 KB). In this situation, network acceleration device 150-C can handle read request R2 locally but must transmit read request R3 over WAN 170, thereby incurring additional latency.

In the situations shown in FIGS. 3A and 3B, the prefetching operations shown improve the perceived client-side response time of the network. Prefetching too much data in one batch, however, can potentially hurt client-perceived response time.

Figure 3C:
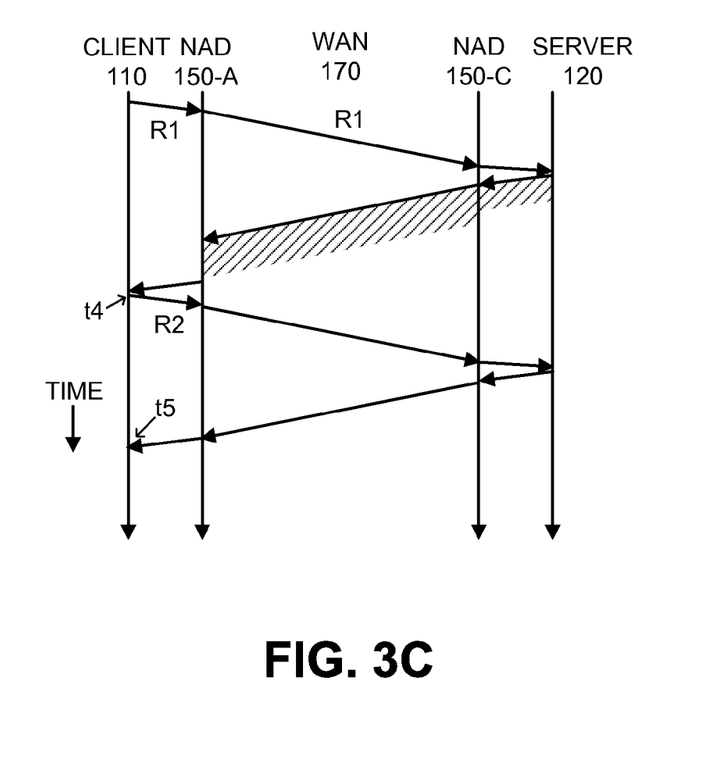
FIGS. 3C and 3D are timing diagrams additionally illustrating prefetching data over a wide area network.
Figure 3D:
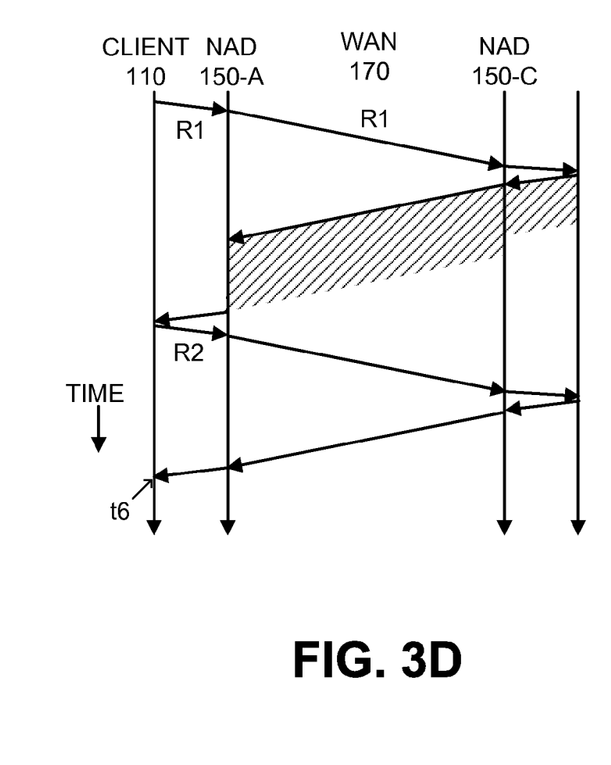

FIGS. 3C and 3D are timing diagrams illustrating additional prefetching operations over WAN 170. In this example, prefetching negatively impacts client-perceived response time.

In the example of FIGS. 3C and 3D, client computing station 110 issues a read request R1 followed by a non-read request R2 (for example, a request for file metadata). No prefetching is performed in FIG. 3C. Instead, non-read request R2 is initiated, at time t4, after read request R1 completes, and finishes at time t5. FIG. 3D is similar to FIG. 3C except that a large prefetch request P1 is issued. If the link bandwidth of WAN 170 is low and the prefetched data is not very compressible, the data transfer could take fairly long time and therefore delay the completion of request R2. Accordingly, in FIG. 3D, non-read request R2 finishes at a later point in time (t6) than non-read request R2 in FIG. 3C, which finishes at time t5.

Factors Affecting Effectiveness of Prefetching

The optimal choice of prefetch batch size depends on many different factors. These factors will now be described.

Available bandwidth on WAN 170. The available bandwidth determines the data transmission time. For example, transferring 256 KB of data takes approximately 2 seconds on a 1 Mbps link but takes only approximately 100 milliseconds on a 20 Mbps link. Therefore, if the bandwidth is high, network acceleration devices 150 can potentially afford to use a larger batch size without significant effect on the response time. On the other hand, if the bandwidth is low, a small batch size may be better to avoid unnecessarily delaying subsequent requests.

Round-trip time on WAN 170. Since each cache miss (i.e., when the client requests some data that has not been prefetched yet) incurs a round trip time (RTT) across WAN 170, the cache miss penalty becomes higher when the WAN RTT is higher. Therefore, with a high RTT, it may be desirable to use a large batch size even though it may introduce delays to other requests. However, if the RTT is low, a large batch size may not be necessary due to the low cache miss penalty.

Compression ratio achieved by network acceleration devices 150. Network acceleration devices 150 may reduce the data transmission time by applying various compression techniques. The achieved compression ratio depends on many factors such as the compression algorithm used, the device load, the compressibility of file data, and (for some techniques) whether/how long ago the same data has been seen before. A high compression ratio means that the effective bandwidth is high. For example, if the available bandwidth is 1 Mbps, and the compression ratio is 95%, then the effective bandwidth becomes 20 Mbps. Therefore, the compression ratio can be seen as a multiplier for the available bandwidth.

Data locality of file access. Data locality refers to the likelihood of read requests being close together both "spatially" and "temporally." As two extreme examples, sequential access to a file presents the highest locality, and completely random access has no locality. In general, the higher the locality, the more effective prefetching is, and therefore a larger prefetch batch size may be used. To determine the data locality, hints from applications may be used. For example, when opening a file for read, the client may indicate whether the access will be sequential or non-sequential. In addition, the cache hit rate may be used as a historical indication of data locality.

Effect on WAN 170. Since prefetch generates extra traffic on WAN 170, it reduces the available bandwidth and as a result increases the transmission delay of other traffic traversing the same WAN link. However, if the data locality is high, most of the prefetched data can be used to satisfy subsequent requests (which would have traversed the WAN), so over the long term prefetch will tend to not have a significant effect on other traffic. Therefore, when there is little or no competing traffic on the WAN link, a large batch size may be desirable to utilize the WAN bandwidth. On the other hand, when there is a lot of competing traffic, a small batch size will tend to be desirable unless the data locality is high.

Effect on server performance. Prefetch requests increase the load on servers 120 since the servers send extra data to satisfy the requests. If server capacity is represented as the read bandwidth that can be sustained by the server for all client computing stations, then prefetch requests for a particular client will decrease the read bandwidth available to other client computing stations. Similar to the WAN traffic discussion above, this negative effect can be negated if the data locality is high. Therefore, when a server 120 is serving many clients, it may be desirable to use a small prefetch batch size unless data locality is high.

From the above definitions, the following equation is derived.

$$T_p = T_{rtt} + \frac{S}{\text{MIN}\left(\frac{B_c - B_o}{1 - R_c}, F_c - F_o\right)}, \quad \text{(Eq 1)}$$

where S is the prefetch batch size, $T_p$ is the prefetch time, $T_{rtt}$ is the round-trip time on WAN 170, $B_c$ is the bandwidth capacity of the WAN link, $B_o$ is the bandwidth on the link consumed by other traffic, $R_c$ is the compression ratio of the data transmitted across the WAN, $F_c$ is the capacity of a server 120, and $F_o$ is the capacity of a server 120 that is consumed by other clients. Further, in Eq. 1, MIN represents the minimum operation.

More specifically, the "prefetch time" ($T_p$) corresponding to the data transfer will be used to refer to the time spanning when the request is made to when the batch is received (i.e., interval t3-t1 in FIG. 3A). Additionally, the "prefetch transfer time" ($T_{pt}$) will be used to refer to the time spanning when data from the batch is first received by the network acceleration device to when to the batch is finished being received (i.e., interval t3-t2 in FIG. 3A).

The prefetch transfer time can be written as:

$$T_{pt} = T_p - T_{rtt} = \frac{S}{\text{MIN}\left(\frac{B_c - B_o}{1 - R_c}, F_c - F_o\right)}, \quad \text{(Eq 2)}$$

or $$T_{pt} = S \cdot \frac{1}{\text{MIN}\left(\frac{B_c - B_o}{1 - R_c}, F_c - F_o\right)}. \quad \text{(Eq 3)}$$

On the right hand side of equation (3), it can be seen that the first term, S, represents the "benefit" of the prefetch, i.e., the benefit is higher when the batch size is larger (ignoring data locality). The second term in equation (3), which includes the available bandwidth, compression ratio, other WAN traffic bandwidth, and server load, represents the "unit cost" of prefetch, i.e., the cost per unit of benefit. Therefore, $T_{pt}$ can be thought of as representing the total cost of the prefetch. Based on this observation, concepts consistent with aspects of the invention optimize prefetching by observing $T_{pt}$ and modifying the prefetch batch size accordingly.

Operation of Network Acceleration Devices

Consistent with aspects of the invention, the prefetch transfer time, $T_{pt}$, may be used as a measurement of the total cost of the prefetch operation. Network acceleration devices 150 may attempt to optimize the effectiveness of prefetching operations by modifying the prefetch batch size based on the measured prefetch transfer time.

Figure 4:
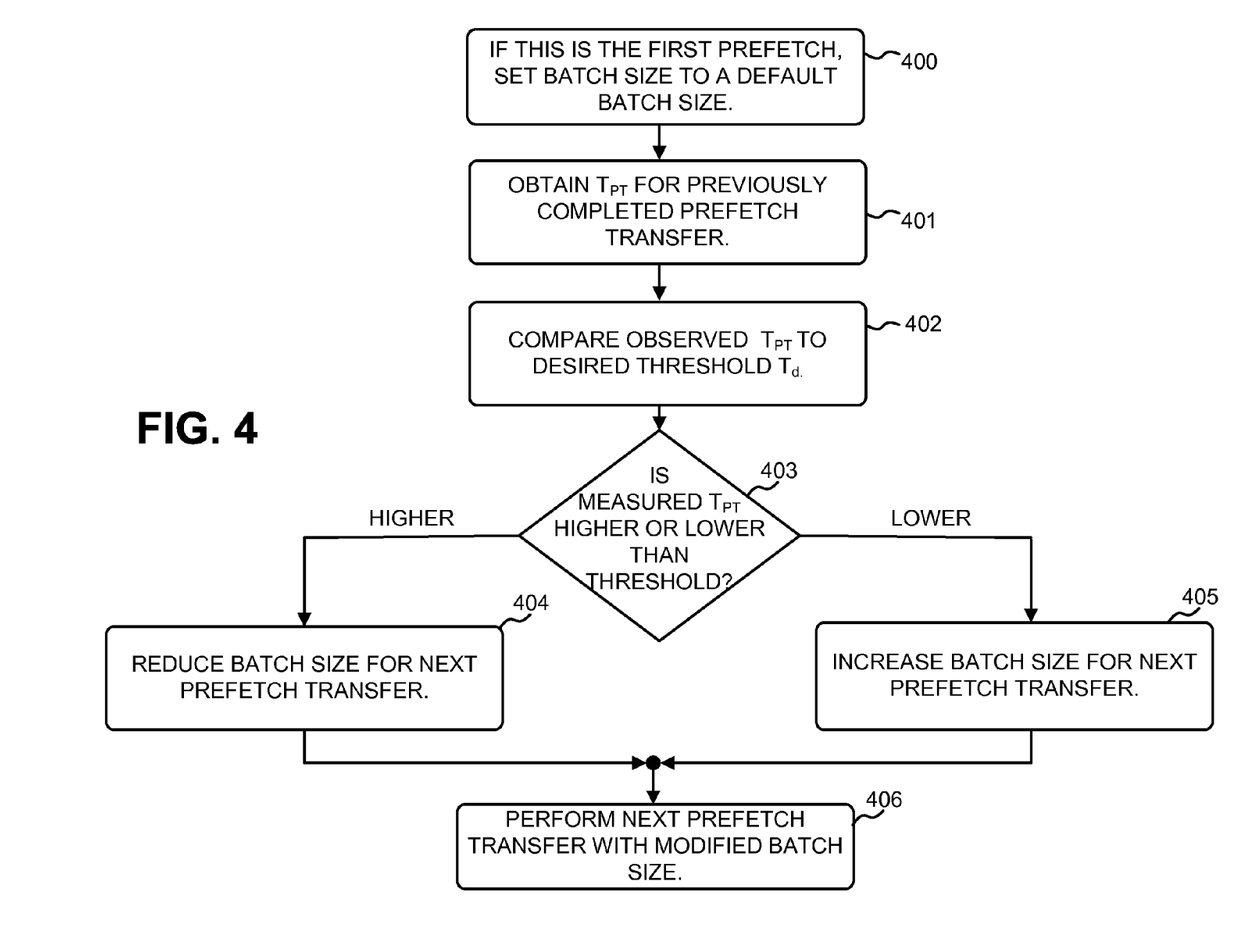
FIG. 4 is a flow chart illustrating exemplary operations of network acceleration devices in prefetching batches of data over a wide area network.

FIG. 4 is a flow chart illustrating exemplary operations of network acceleration devices 150 in prefetching batches of data over a WAN. The operations shown in FIG. 4 may be performed for each prefetch operation and may be performed on a per connection (e.g., per user) basis.

To begin, a network acceleration device 150 may set the prefetch batch size to a default batch size (act 400). The default batch size may be used when a prefetch operation has not yet been completed, such as the first prefetch operation of a session. The network acceleration device 150 may observe the prefetch transfer time for the previously completed prefetch transfer (act 401). The prefetch transfer time may be empirically measured as the time between when data from the previous prefetch batch was initially received until the time when all of the data from the previous batch was received. In other words, the prefetch transfer time corresponds to the time it takes for the data of the previous prefetch batch to transfer over WAN 170 (illustrated in FIG. 3A as area 305). In some implementations, instead of using only the previous prefetch transfer time, multiple previous prefetch transfer times may be used and averaged or combined in some other manner.

The prefetch transfer time observed in act 401 may be compared to a desired prefetch transfer time threshold ($T_d$) (act 402). $T_d$ corresponds to a desired level for the prefetch transfer time. $T_d$ may be determined empirically based on the fact that $T_d$ also represents the "additional latency for the next request" introduced by the prefetch. In other words, $T_d$ can be defined as the maximum additional latency that can be incurred by the prefetch without significantly degrading the response time. In some implementations, $T_d$ may be set by the designer or manufacturer of network acceleration device 150 and may not be a user configurable option. In other implementations, the user may be allowed to configure $T_d$.

It may be determined whether the measured prefetch transfer time is higher or lower than the threshold $T_d$ (act 403). If higher, this is an indication that the cost of the previous prefetch was too high (i.e., higher than optimal). The batch size for the next prefetch transfer may be reduced to compensate (act 404). The reduction may be proportional to the difference between the measured prefetch transfer time and $T_d$. If the measured prefetch transfer time is lower than the threshold $T_d$, this is an indication that the cost of the previous prefetch was too low (i.e., lower than optimal), in which case more benefits can be gained by paying a higher cost. Therefore, the batch size for the next prefetch transfer may be increased to compensate (act 405). The increase may be proportional to the difference between the measured prefetch transfer time and $T_d$.

The batch size, as modified in acts 404 and 405, may be used when performing the next prefetch transfer (act 406). Performing the next prefetch transfer may include submitting the next prefetch request and receiving back the prefetch data. In this manner, the batch size can be kept at an optimal level based on a straightforward measurement of the historical prefetch transfer time.

When receiving the next prefetch batch, network acceleration device 150 may store the time of the transfer and an identifier associated with the prefetch batch transfer request. When the data associated with this prefetch batch is fully received, network acceleration device 150 may then use this information to calculate $T_{pt}$.

Although the operations of FIG. 4 were described as modifying the prefetch batch size based on whether the measured prefetch transfer time is greater than or less than a threshold value, in practice, to avoid oscillation around the threshold $T_d$, a range can be used instead of a fixed threshold. $T_{pt}$ may be considered acceptable as long as it is within this range. If it drops below the minimum, the prefetch batch size will be increased. Conversely, if it rises above the maximum, the prefetch batch size will be decreased.

The acts shown in FIG. 4 address the factors described above as relating to the effectiveness of prefetching except the round-trip transfer time of the WAN (WAN RTT) and data locality. WAN RTT and data locality can both be considered as "modifiers" to the benefits of data locality. For instance, a higher WAN RTT means the benefit of prefetching is higher (with a higher WAN RTT, each cache miss incurs a longer latency). Similarly, the prefetch benefit increases with increasing data locality because higher data locality implies that the prefetched data is more likely to be used (i.e., more cache hits).

Two functions may be defined to represent modifier values corresponding to the WAN RTT and data locality: $M_1(T_{rtt})$ and $M_2(L)$, where $T_{rtt}$ refers to WAN RTT and L refers to data locality. In one implementation, $M_1(T_{rtt})$ may be a monotonically increasing function of the WAN RTT and $M_2(L)$ may be a monotonically increasing function of the data locality (L).

More specifically, let $T_{mpt}$ denote the "modified prefetch time." Equation (3) can then be extended as follows.

$$T_{mpt} = \frac{T_{pt}}{M_1(T_{rtt}) \cdot M_2(L)}, \text{ and} \quad \text{(Eq 4)}$$

$$T_{mpt} = \frac{S}{M_1(T_{rtt}) \cdot M_2(L)} \cdot \frac{1}{\text{MIN}\left(\frac{B_c - B_o}{1 - R_c}, F_c - F_o\right)}. \quad \text{(Eq 5)}$$

In other words, when the prefetch benefit is higher (due to a higher WAN RTT and/or higher data locality), the total cost may be reduced by the modifiers $M_1$ and $M_2$. As a result, S can be increased more before the modified total cost $T_{mpt}$ reaches the threshold $T_d$.

Figure 5:
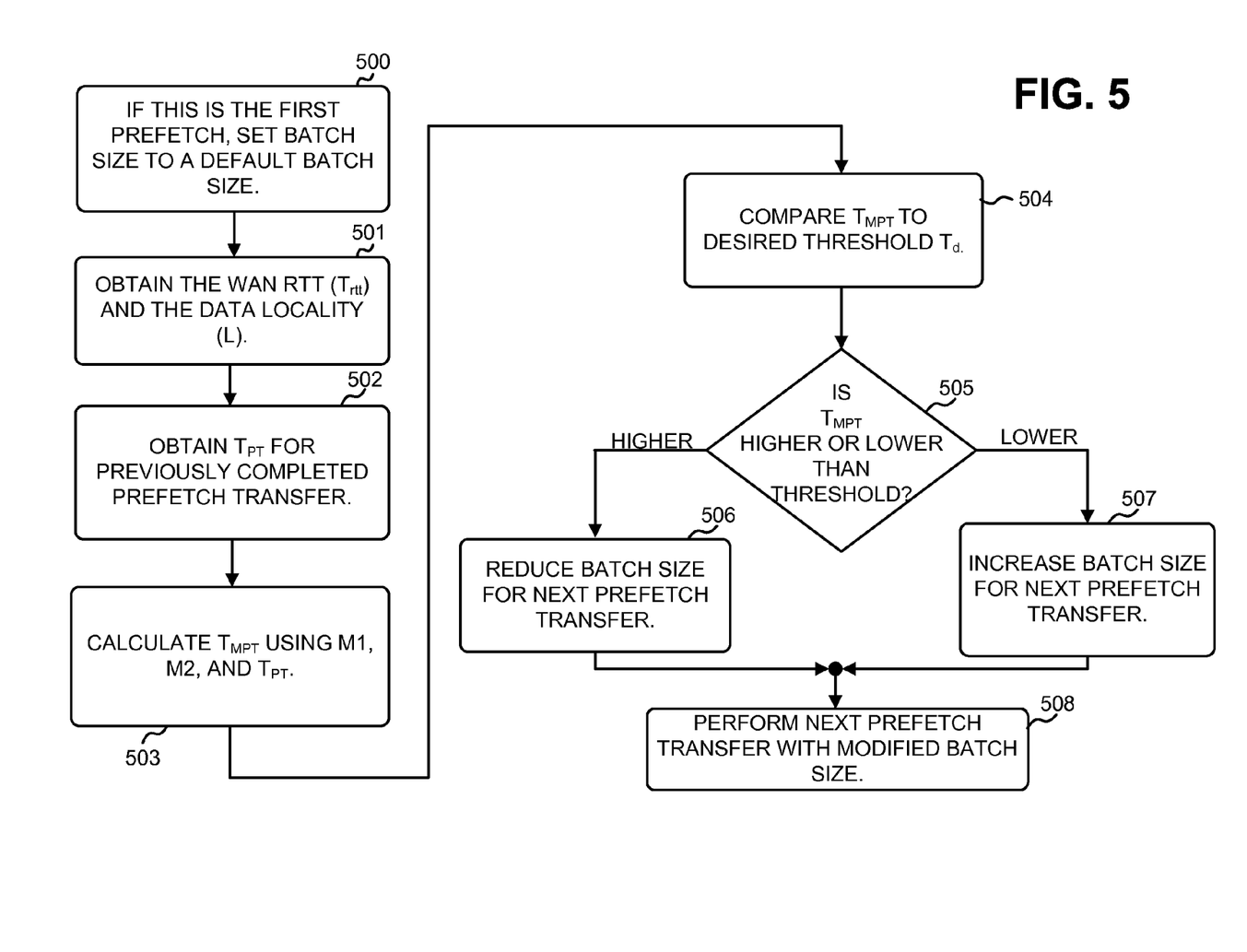
FIG. 5 is a flow chart illustrating additional exemplary operations of network acceleration devices in prefetching batches of data over a wide area network.

FIG. 5 is a flow chart illustrating exemplary operations of network acceleration devices 150 in prefetching batches of data over a WAN in accordance with a second aspect. In the operations shown in the flow chart of FIG. 5, WAN RTT and data locality are additionally taken into consideration. The operations shown in FIG. 5 may be performed for each prefetch operation and may be performed on a per connection (e.g., per user) basis.

To begin, a network acceleration device 150 may set the prefetch batch size to a default size (act 500). The default batch size may be used when a prefetch operation has not yet been completed, such as the first prefetch operation of a session.

Network acceleration device 150 may obtain the WAN RTT ($T_{rtt}$) and the data locality (L) (act 501). Network acceleration device 150 may obtain the WAN RTT by directly measuring the WAN RTT from previous prefetch requests or from test requests (such as a network "ping" request) specifically generated to the corresponding other network acceleration device 150. In alternate implementations, the WAN RTT may be obtained in other ways, such as by looking up the WAN RTT from another network device designed to measure and/or monitor WAN RTT between various network acceleration devices. The WAN RTT may not necessarily be received before every prefetch operation. That is, in some implementations, the WAN RTT may be obtained occasionally.

The data locality of the session may be estimated by network acceleration device 150 as a value that measures the likelihood of read requests being close together spatially (i.e., the likelihood that consecutive read requests are likely to access the next portion of a file or a next file in a list of files) and/or temporally (i.e., the likelihood that consecutive read requests are likely to be close together in time). Data locality may be estimated by a network acceleration device 150 from application hints and/or from observed access patterns. For example, if a client continues to read adjacent blocks of data within a file sequentially, network acceleration device 150 may infer that the data locality is high and may assign the data locality a correspondingly high value.

Referring back to FIG. 5, network acceleration device 150 may obtain the prefetch transfer time for the previously completed prefetch transfer (act 502). Act 502 is identical to act 401, described previously.

Network acceleration device 150 may calculate the modified prefetch time, $T_{mpt}$, using equation (4) (act 503). In other words, in this implementation, the prefetch transfer time obtained in act 501 may be modified based on data locality and/or the WAN RTT. In some implementations, instead of modifying the prefetch transfer time based on both the data locality and the WAN RTT, only one of these values may be used.

The modified prefetch time, $T_{mpt}$, may then be compared to the desired threshold $T_d$ (act 504). $T_d$ corresponds to a desired level for the modified prefetch transfer time. $T_d$ may be determined empirically based on the fact that $T_d$ also represents the "additional latency for the next request" introduced by the prefetch. In other words, $T_d$ can be defined as the maximum additional latency that can be incurred by the prefetch without significantly degrading the response time. In some implementations, $T_d$ may be set by the designer or manufacturer of network acceleration device 150 and may not be a user configurable option. In other implementations, the user may be allowed to configure Td.

The granularity of the data locality variable L may be coarse. For example, instead of a continuous spectrum of data locality values, network acceleration device 150 may only differentiate between sequential and non-sequential access patterns. In this case, M2(L) may encompass only two different values. Equivalently, in this case, M2(L) may not be explicitly used, and instead, two different $T_d$ thresholds can be defined; one $T_d$ (the larger one) may be used for sequential access and the other for non-sequential access.

It may be determined whether the modified prefetch transfer time is higher or lower than the threshold Td (act 505). If higher, this is an indication that the cost of the previous prefetch was too high (i.e., higher than optimal). The batch size for the next prefetch transfer may be reduced to compensate (act 506). The reduction may be proportional to the difference between the modified prefetch transfer time and $T_d$. If the modified prefetch transfer time is lower than the threshold $T_d$, this is an indication that the cost of the previous prefetch was too low (i.e., lower than optimal), in which case more benefits can be gained by paying a higher cost. Therefore, the batch size for the next prefetch transfer may be increased to compensate (act 507). The increase may be proportional to the difference between the modified prefetch transfer time and $T_d$.

The batch size, as modified in acts 506 and 507, may be used when performing the next prefetch transfer (act 508). In this manner, the batch size can be kept at an optimal level.

When transferring the next batch, network acceleration device 150 may store the time of the transfer and an identifier associated with the prefetch batch transfer request. When the data associated with this prefetch batch is fully received, network acceleration device 150 may then use this information to calculate $T_{pt}$.

As with the operations of FIG. 4, the operations in FIG. 5 may be implemented using a range for $T_d$ instead of a single value to avoid oscillations around $T_d$.

Although the above description of network acceleration devices 150 primarily described network acceleration devices 150 as being a stand-alone network device, the functionality of the network acceleration devices may be implemented within other network devices. For example, the functionality of the network acceleration devices may be integrated within a firewall, router, or other network device.

Additionally, it is noted that the modifier $M_1(T_{rtt})$ has two effects: it essentially increases the batch size when the WAN RTT is high and decreases the batch size when the WAN RTT is low. However, since the threshold $T_d$ corresponds to the maximum additional latency introduced by a prefetch operation, increasing the batch size may result in unacceptable degradation of response time. Therefore, in some implementations, it may only be desirable to want the second effect of $M_1(T_{rtt})$, i.e., preventing unnecessarily large batch sizes when the WAN RTT is low. This can be achieved by imposing a "maximum effective throughput" constraint. For example, if $T_p$ is 250 ms (e.g., $T_{rtt}$=50 ms and $T_{pt}$=200 ms), and the batch size is currently 2 MB, then the current effective throughput is 64 Mbps. If a maximum effective throughput constraint of 60 Mbps is imposed, then the batch size would be reduced for the next batch.

CONCLUSION

A data prefetching technique was described for optimizing the batch size of prefetch requests. One advantage of the techniques described herein is that both Tpt and WAN RTT can be measured at the network acceleration device, and data locality can be obtained from application hints and/or from observed access patterns. Therefore, all required information can be obtained without incurring extra WAN usage costs.

For example, while a series of acts have been described with regard to FIGS. 4 and 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A system, comprising:
a first network acceleration device associated with a client device, where the first network acceleration device is to:
identify prefetch data likely to be requested by the client device in a future request,
determine a batch size, for the prefetch data, as a function of a prefetch transfer time observed for one or more previous prefetch requests over a link, available bandwidth on the link, and available data capacity in the first network acceleration device, where the prefetch transfer time includes an elapsed time interval from when data associated with one of the previous prefetch requests is first received to when all of the data associated with the one of the previous prefetch requests is finished being received, and
transmit a data prefetch request for the prefetch data based on the determined batch size of data; and
a second network acceleration device, associated with the prefetch data, to:
receive the data prefetch request, and
transmit, in response to the data prefetch request and to the first network acceleration device, the prefetch data according to the determined batch size of data,
where the first network acceleration device is further to:
obtain a round trip time for data traversing a network associated with the first network acceleration device, and
use the round trip time when determining the batch size.

2. The system of claim 1, where the first and second network acceleration devices are separated by a wide area network.

3. The system of claim 1, where, when determining the batch size to request, the first network acceleration device is further to:
compare the prefetch transfer time to a threshold value, and
adjust a previous batch size, associated with one of the previous prefetch requests, based on the prefetch transfer time being above or below the threshold value.

4. A system comprising:
a first network acceleration device associated with a client device, where the first network acceleration device is to:
identify prefetch data likely to be requested by the client device in a future request,
determine a batch size, for the prefetch data, as a function of a prefetch transfer time observed for one or more previous prefetch requests over a link, available bandwidth on the link, and available data capacity in the first network acceleration device, where the prefetch transfer time includes an elapsed time interval from when data associated with one of the previous prefetch requests is first received to when all of the data associated with the one of the previous prefetch requests is finished being received, and
transmit a data prefetch request for the prefetch data based on the determined batch size of data; and
a second network acceleration device, associated with the prefetch data, to:
receive the data prefetch request, and
transmit, in response to the data prefetch request and to the first network acceleration device, the prefetch data according to the determined batch size of data,
where, when determining the batch size to request, the first network acceleration device is further to:
compare the prefetch transfer time to a threshold value, and
adjust a previous batch size, associated with one of the previous prefetch requests, based on the prefetch transfer time being above or below the threshold value,
where the threshold value is a value within a range of values, and
where the first network acceleration device, when adjusting a previous batch size, is further to:
reduce the previous batch size when the prefetch transfer time is above a high end of the range, and increase the previous batch size when the prefetch transfer time is below a low end of the range.

5. The system of claim 1, where the first network acceleration device is further to:
obtain an indication of data locality of a session corresponding to the data prefetch requests, where the indication of data locality includes a likelihood that a plurality of read requests to acquire the data are at least one of spatially close or temporally close to one another, and
use the obtained indication of data locality when determining the batch size.

6. A device, comprising:
a processor to:
calculate a prefetch transfer time over a link in a network, where the prefetch transfer time includes an elapsed time interval from when data from a previous prefetch is first received by the device to when the data from the previous prefetch is finished being received by the device,
determine a batch size of new data that is to be prefetched, where the batch size of the new data is a function of the prefetch transfer time of the previous prefetch, an amount of bandwidth available via the link, and a data compression rate associated with the link; and
initiate a data prefetch over the network using the determined batch size,
where the processor, when determining the batch size, is further to:
compare the prefetch transfer time to a threshold value;
reduce the batch size of the data that is to be prefetched when the prefetch transfer time is above the threshold value; and
increase the batch size of the data that is to be prefetched when the prefetch transfer time is below the threshold value,
where the threshold value is a value within a range of values, and where the processor, when determining the batch size, is further to:
reduce the batch size when the prefetch transfer time is above a high end of the range, and
increase the batch size when the prefetch transfer time is below a low end of the range.

7. The device of claim 6, where the processor, when determining the batch size is further to:
determine the batch size of the new data to be prefetched based on an available data capacity in the device.

8. The device of claim 6, where the processor is further to:
obtain a round trip time for data traversing the network,
where the batch size is further a function of the obtained round trip time.

9. The device of claim 6, where the processor is further to:
obtain an indication of data locality of a session corresponding to the data that is to be prefetched,
where the indication of data locality includes a likelihood that a plurality of read requests to acquire the data are at least one of spatially close or temporally close to one another, and where the processor is to use the obtained indication of data locality when determining the batch size.

10. The device of claim 6, where the processor is further to:
obtain a round trip time for data traversing the network;
obtain an indication of data locality of a session corresponding to the data that is to be prefetched, where the indication of data locality includes a likelihood that a plurality of read requests to acquire the data are at least one of spatially close or temporally close to one another; and
use the obtained round trip time and the obtained indication of data locality when determining the batch size.

11. The device of claim 6, where the processor, when determining the batch size, is further to:
determine the batch size as a function of a previous batch size.

12. A method comprising:
measuring, by a network device, a prefetch transfer time, over a link in a network, for a previously prefetched batch of data, the prefetch transfer time including an elapsed time interval from when portions of the previously prefetched batch of data is first received by the network device to when the previously prefetched batch of data is finished being received by the network device;
comparing, by the network device, the prefetch transfer time to a threshold value;
identifying, by a network device, prefetch data likely to be requested by a client device in a future request;
determining, by the network device, a size of a next batch of data, associated with the prefetch data that is to be prefetched over the network, based on a size of the previously prefetched batch of data, results from comparing the prefetch transfer time to the threshold value, and available capacity in the network device; and
transmit a data prefetch request for the prefetch data based on the determined size of the next batch of data,
where the threshold value is a value within a range of values and where modifying the size of the next batch of data includes:
reducing the size of the next batch of data when the prefetch transfer time is above a high end of the range of values; and
increasing the size of the next batch of data when the prefetch transfer time is below a low end of the range of values.

13. The method of claim 12, where determining the size of the next batch of the data includes:
increasing the size of the next batch of data when the measured prefetch transfer time is lower than the threshold value, and
decreasing the size of the next batch of data when the measured prefetch transfer time is higher than the threshold value.

14. The method of claim 12, further comprising:
setting the size of the next batch of data to a default size for a first prefetch operation.

15. The method of claim 12, further comprising:
obtaining a round trip time for data traversing the network,
where determining the size of the next batch of data includes using the obtained round trip time to calculate the size of the next batch of data.

16. The method of claim 12, further comprising:
obtaining an indication of data locality of a session corresponding to the data that is to be prefetched,
where the indication of data locality includes a likelihood that a plurality of read requests to acquire the data are at least one of spatially close or temporally close to one another, where the determining of the size of the next batch of data includes using the obtained indication of data locality when calculating a size of the next batch of data.

17. The method of claim 12, where measuring the prefetch transfer time includes:

storing an identifier for the previously prefetched batch of data;

storing a time associated with the previously prefetched batch of data; and using the identifier and the stored time to measure the prefetch transfer time.

18. The method of claim 12, where determining the size of the next batch of data that is to be prefetched further includes:

modifying the size of the next batch of data that is to be prefetched based on available bandwidth on the link and a data compression rate associated with the link.

\* \* \* \* \*